United States Patent [19]

Das

[11] Patent Number: 5,159,511
[45] Date of Patent: Oct. 27, 1992

[54] BIASING CONDUCTOR FOR MR HEAD

[75] Inventor: Shyam C. Das, Sudbury, Mass.

[73] Assignee: Digital Equipment Corporation, Maynard, Mass.

[21] Appl. No.: 546,368

[22] Filed: Jun. 29, 1990

Related U.S. Application Data

[63] Continuation-in-part of Ser. No. 370,049, Jun. 22, 1989, abandoned, which is a continuation of Ser. No. 253,390, Oct. 4, 1988, Pat. No. 4,885,649, which is a continuation of Ser. No. 33,466, Apr. 1, 1987, abandoned.

[51] Int. Cl.$^5$ .............................................. G11B 5/39
[52] U.S. Cl. ................................................. 360/113
[58] Field of Search ....................... 360/113; 338/32 R; 324/252

[56] References Cited

U.S. PATENT DOCUMENTS

| | | | |
|---|---|---|---|
| 3,016,507 | 1/1962 | Grant et al. | 338/32 |
| 3,355,727 | 11/1967 | Gaubatz | 340/174.1 |
| 3,366,939 | 1/1968 | De Chanteloup | 340/174 |
| 3,379,895 | 4/1968 | Green | 307/88 |
| 3,686,751 | 8/1972 | Sugiyama | 29/603 |
| 3,700,838 | 10/1972 | Zacaroli | 179/100.2 |
| 3,880,602 | 4/1975 | Valin et al. | 29/195 |
| 3,881,190 | 4/1975 | Brock et al. | 179/100 |
| 3,908,194 | 9/1975 | Romankiw | 360/113 |
| 3,921,217 | 11/1975 | Thompson | 360/113 |
| 3,943,570 | 3/1976 | Yamamoto et al. | 360/112 |
| 3,947,889 | 3/1976 | Lazzari | 360/113 |
| 3,961,299 | 6/1976 | Lazzari et al. | 336/218 |
| 3,967,368 | 7/1976 | Brock et al. | 29/603 |
| 4,071,868 | 1/1978 | Kaminaka et al. | 360/113 |
| 4,103,315 | 7/1978 | Hempstead et al. | 360/110 |
| 4,150,408 | 4/1979 | Koel et al. | 360/113 |
| 4,151,574 | 4/1979 | Gerkema et al. | 360/113 |
| 4,164,770 | 8/1979 | Jeffers | 360/113 |
| 4,195,323 | 3/1980 | Lee | 360/113 |
| 4,228,473 | 10/1980 | Himuro et al. | 360/114 |
| 4,242,710 | 12/1980 | Hempstead et al. | 360/113 |
| 4,255,772 | 3/1981 | Perez et al. | 360/113 |
| 4,300,177 | 11/1981 | Koel et al. | 360/113 |
| 4,317,148 | 2/1982 | Chi | 360/119 |

(List continued on next page.)

FOREIGN PATENT DOCUMENTS

| | | |
|---|---|---|
| 0037967 | 4/1980 | European Pat. Off. . |
| 0152326 | 11/1983 | European Pat. Off. . |
| 0154005 | 2/1984 | European Pat. Off. . |
| 56-163517 | 4/1980 | Japan . |
| 56-165925 | 5/1980 | Japan . |
| 57-141013 | 2/1981 | Japan . |
| 57-164416 | 3/1981 | Japan . |
| 58108025 | 12/1981 | Japan . |
| 58111114 | 12/1981 | Japan . |
| 6226612 | 3/1982 | Japan . |
| 5930227 | 5/1982 | Japan . |
| 5954070 | 6/1982 | Japan . |
| 6289206 | 7/1982 | Japan . |
| 62129909 | 11/1982 | Japan . |
| 6148116 | 8/1984 | Japan . |
| 6168713 | 10/1984 | Japan . |
| 61229209 | 12/1984 | Japan . |
| WO88/07741 | 10/1988 | PCT Int'l Appl. . |
| 2149186 | 7/1984 | United Kingdom . |

OTHER PUBLICATIONS

Lazzari et al., "Thin-Film Head Study for Perpendicular Recording", IEEE Transactions on Magnetics, vol. Mag-17, No. 6, Nov. 1981.

Hanazono et al., "Fabrication Of A Thin-Film Head Using Polyamide Resin And Sputtered Ni-Fe Films", J. Appl. Phys, 53(3), Mar. 1982, pp. 2608-2610.

Lazzari et al., "A New Thin-Film Head Generation IC Head", IEEE Transactions on Magnetics, vol. 25, No. 5, Sep. 1989, pp. 3190-3193.

Jeffers, "Magnetoresistive Tranducer With Canted (List continued on next page.)

Primary Examiner—Robert S. Tupper
Attorney, Agent, or Firm—Fish & Richardson

[57] ABSTRACT

A read-write head comprising a magneto-resistive element and a conductor for producing a longitudinal magnetic bias field along said MR element. The conductor may also be arranged to produce a transverse magnetic bias field.

27 Claims, 3 Drawing Sheets

U.S. PATENT DOCUMENTS

| | | | |
|---|---|---|---|
| 4,335,410 | 6/1982 | Neu | 360/123 |
| 4,356,523 | 10/1982 | Yeh | 360/113 |
| 4,356,524 | 10/1982 | Watanabe | 360/129 |
| 4,357,640 | 11/1982 | Heinz et al. | 360/119 |
| 4,374,403 | 11/1982 | Oshima et al. | 360/113 |
| 4,376,337 | 3/1983 | Kobayasi et al. | 29/603 |
| 4,385,334 | 5/1983 | Yanagida | 360/125 |
| 4,391,849 | 6/1983 | Bischoff | 427/129 |
| 4,404,609 | 9/1983 | Jones, Jr. | 360/126 |
| 4,413,296 | 11/1983 | Jeffers | 360/113 |
| 4,424,271 | 1/1984 | Keel et al. | 430/315 |
| 4,425,593 | 1/1984 | Postma | 360/113 |
| 4,458,279 | 7/1984 | Katz | 360/123 |
| 4,489,357 | 12/1984 | Van Ooijen et al. | 360/113 |
| 4,523,243 | 6/1985 | Billington | 360/113 |
| 4,535,375 | 8/1985 | Mowry et al. | 360/113 |
| 4,566,050 | 1/1986 | Beam et al. | 360/113 |
| 4,575,777 | 3/1986 | Hosokawa | 360/123 |
| 4,594,619 | 6/1986 | Hijikigawa | 360/74.4 |
| 4,601,099 | 7/1986 | Nishiyama | 29/603 |
| 4,604,670 | 8/1986 | Visser | 360/127 |
| 4,613,918 | 9/1986 | Kanai et al. | 360/113 |
| 4,626,946 | 12/1986 | Vinal | 360/113 |
| 4,633,352 | 12/1986 | Mizoguchi et al. | 360/104 |
| 4,636,897 | 1/1987 | Nakamura et al. | 360/119 |
| 4,639,289 | 1/1987 | Lazzari | 156/643 |
| 4,639,811 | 1/1987 | Diepers et al. | 360/125 |
| 4,644,432 | 1/1987 | Heim | 360/113 |
| 4,649,447 | 3/1987 | Huang et al. | 360/113 |
| 4,651,243 | 3/1987 | Daste et al. | 360/104 |
| 4,652,954 | 3/1987 | Church | 360/120 |
| 4,656,546 | 4/1987 | Mallory | 360/110 |
| 4,663,685 | 5/1987 | Tsang | 360/113 |
| 4,667,260 | 5/1987 | Perlov et al. | 360/122 |
| 4,668,913 | 5/1987 | Vinal | 324/235 |
| 4,672,493 | 6/1987 | Schewe | 360/125 |
| 4,675,766 | 6/1987 | Schewe | 360/123 |
| 4,683,508 | 7/1987 | Jeffers et al. | 360/113 |
| 4,684,438 | 8/1987 | Lazzari | 156/649 |
| 4,695,351 | 9/1987 | Mallory | 204/15 |
| 4,698,711 | 10/1987 | Vinal | 360/113 |
| 4,700,252 | 10/1987 | Muraoka et al. | 360/113 |
| 4,713,710 | 12/1987 | Soda et al. | 360/121 |
| 4,727,643 | 3/1988 | Schewe et al. | 29/603 |
| 4,731,157 | 3/1988 | Lazzari | 156/643 |
| 4,734,644 | 3/1988 | Imakoshi et al. | 324/252 |
| 4,748,525 | 5/1988 | Perlov | 360/110 |
| 4,750,072 | 6/1988 | Takagi | 360/126 |
| 4,754,354 | 6/1988 | Jeffers | 360/113 |
| 4,758,917 | 7/1988 | Gooch | 360/121 |
| 4,797,766 | 1/1989 | Enz | 360/113 |
| 4,803,580 | 2/1989 | Mowry | 360/113 |
| 4,816,947 | 3/1989 | Vinal et al. | 360/113 |
| 4,816,950 | 3/1989 | Heinz et al. | 360/128 |
| 4,825,318 | 4/1989 | Hoo et al. | 360/121 |
| 4,828,966 | 5/1989 | Mallary et al. | 430/314 |
| 4,837,924 | 6/1989 | Lazzari | 29/603 |
| 4,860,138 | 8/1989 | Vinal et al. | 360/113 |
| 4,885,649 | 12/1989 | Das | 360/113 |
| 4,891,725 | 1/1990 | Mowry | 360/113 |
| 4,907,113 | 3/1990 | Mallary | 360/112 |
| 4,912,584 | 3/1990 | Mallary et al. | 360/126 |
| 4,935,832 | 6/1990 | Das et al. | 360/112 |
| 5,081,554 | 1/1992 | Das | 360/13 |

OTHER PUBLICATIONS

Easy Axis" (IEEE Transactions on Magnetics, vol. Mag-15, No. 6, Nov. 1979, pp. 1628-1629).

Potter, "Self-Consistent Computer Calculations For Perpendicular Magnetic Recording", IEEE Transactions on Magnetics, vol. Mag-16, No. 5, Sep. 1980, pp. 967-972.

Mallary et al, "Frequency Response of Thin-Film Heads With Longitudinal And Transverse Anisotropy", IEEE Transactions on Magnetics vol. 26, No. 5, Sep. 1990, pp. 1334-1336.

Oshiki, "A Thin-Film Head For Perpendicular Magnetic Recording", J. Appl. Phys. 53(3), Mar. 1982, pp. 2593-2595.

Shinagawa et al., "Simulation Of Perpendicular Recording On Co-Cr Media With A Thin Permallory FIlm-Ferrite Composite Heads":, J. Appl. Phys. 53(3), Mar. 1982, pp. 2585-2587.

Iwasaki et al., "An Analysis For The Magnetization Mode For High Density Magnetic Recording", IEEE Transactions on Magnetics, vol. Mag-13, No. 5, Sep. 1977, pp. 1272-1277.

Das et al., "Self Heating Effects On MR Head Performance", Apr. 1990.

Brug et al., "Effect of Sense Current On Barkhausen Noise In Magneto Resistive Recording Heads", Conference on Magnetics and Magnetics Materials, Nov. 28–Dec. 1, 1989.

Mallary et al., "Three-Dimensional Transmission Line Model For Flux Conduction In Thin-Film Recording Heads", J. Appl. Phys. 67(9), May 1990, pp. 4863-4865.

Mallary, "Conduction Of Flux At High Frequencies In Permalloy Strips By Small-Angle Rotations", J. Appl. Phys. 57(1), Apr. 1985, pp. 3952-3954.

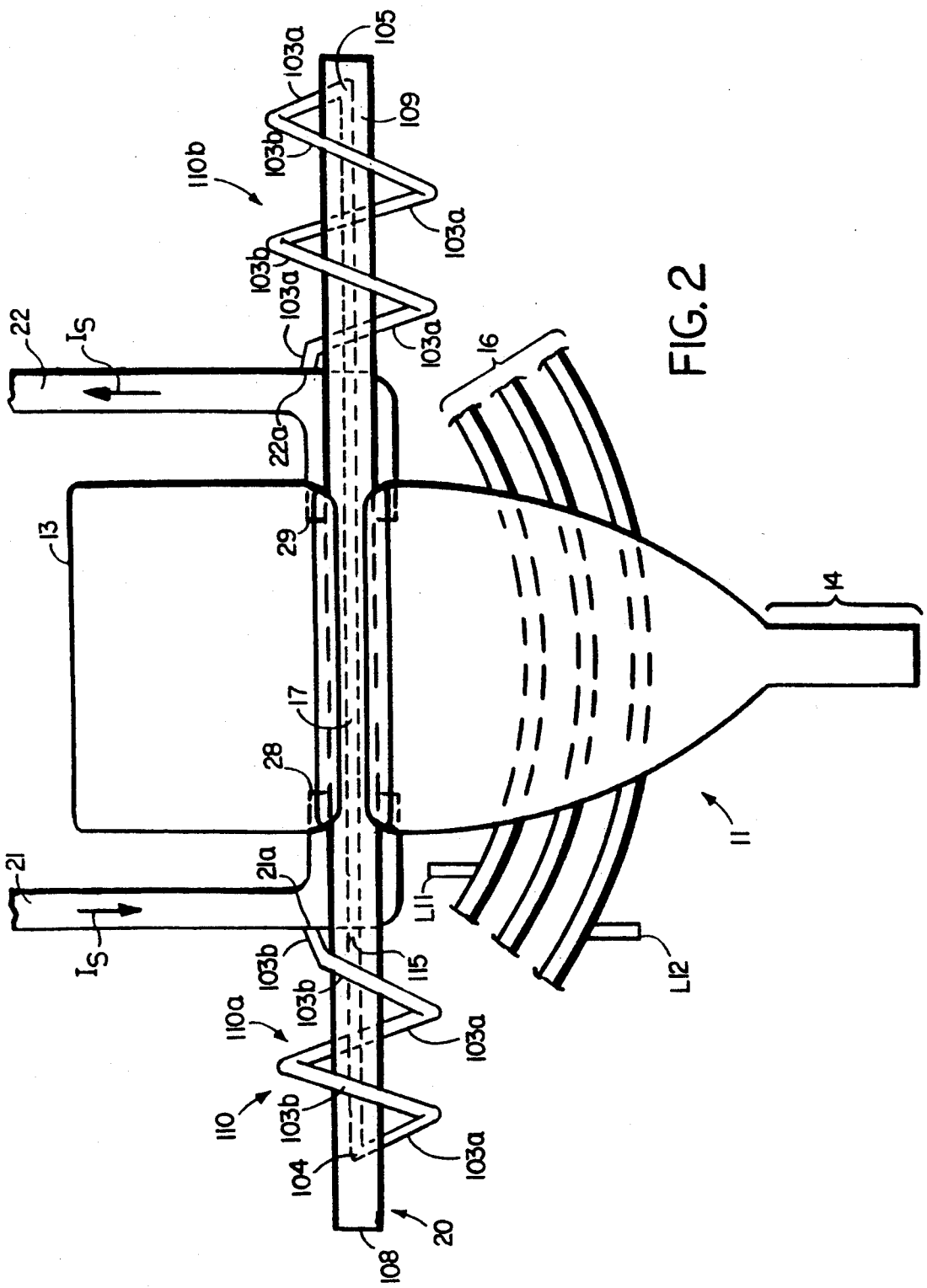

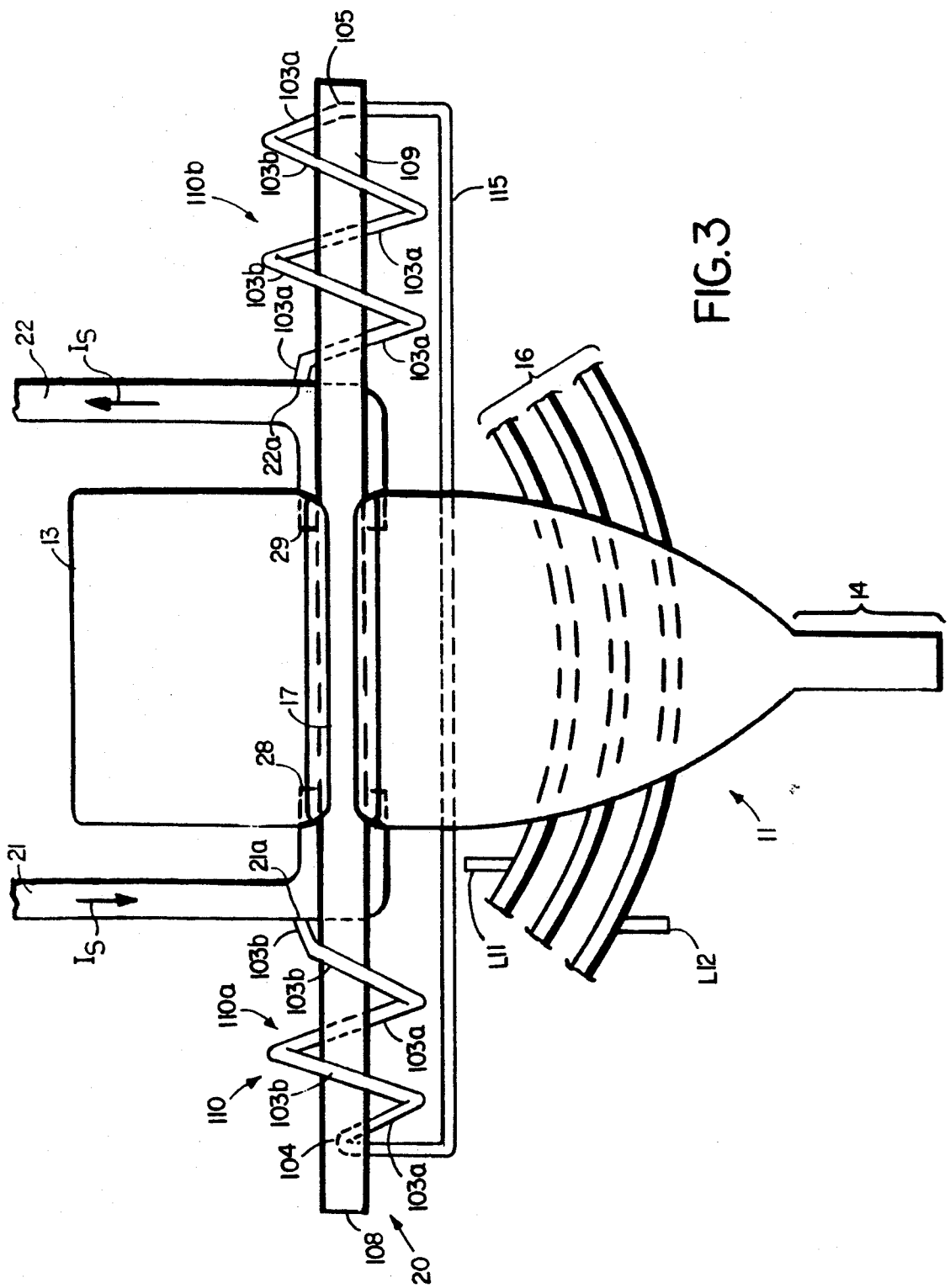

BIASING CONDUCTOR FOR MR HEAD

BACKGROUND OF THE INVENTION

This is a continuation-in-part of copending U.S. Ser. No. 370,049, filed Jun. 22, 1989, now abandoned, which is a continuing application of copending U.S. Ser. No. 253,390, filed Oct. 4, 1988, U.S. Pat. No. 4,885,649, which is a continuing application of U.S. Ser. No. 033,466, filed Apr. 1, 1987, now abandoned, assigned to a common assignee, the specifications of which are incorporated herein by reference.

The invention relates to magnetic field-biasable devices including magnetic data storage devices and read/write heads for use in such devices.

A typical read/write head comprises two poles (or pole pieces) formed from a magnetic material and a conductive coil. At one end, the poles are touching and at the other end there is a slight gap between the poles. The head is positioned so that the gap is directed towards the disk surface. When electric current is impressed on the coil, a magnetic flux is generated, which is impressed upon the poles. At the gap, the magnetic flux is directed through the magnetic material in the adjacent disk surface to thereby impress magnetic flux therein.

When data is being written onto a disk, the coil is energized with a varying voltage pattern which corresponds to the data to be written. The varying voltage results in the generation of a corresponding pattern in the magnetic flux which the head applies to the surface of the rotating disk. Since the disk moves relative to the head, the magnetic flux on the disk surface also varies along the length of the arc traversed by the head on the disk.

When the data is read, the head flies over the arc on the disk surface in which the data was written. A small amount of flux from the disk permeates the head. The flux detected in the head varies in response to the pattern of flux recorded on the disk. The varying flux results in the generation of a varying voltage in the coil, which, in turn, is sensed as the previously-recorded data.

In a conventional read/write head, the variation in the voltage induced in the coil does not directly follow the actual flux, but instead follows the rate or change of the flux as the disk rotates adjacent the head. Therefore reading of data with conventional heads is sensitive to the speed of the disk relative to the head.

Read/write heads have been developed which include a strip of magneto-resistive (MR) material, such as a nickel iron alloy. One such alloy is commercially known as "Permalloy". The MR strip (or element) is positioned in the gap between the tips of the poles. In such heads, the electrical resistance of the magneto-resistive material is related to an applied magnetic field. As flux from the disk permeates the head while it flies over the disk surface, the flux is applied to the magneto-resistive material. Thus, the resistance of the magneto-resistive material varies in response to the variations in the flux in the head, which in turn reflects the variations in the flux on the disk. The changing resistance of the magneto-resistive element is sensed by conventional sensing circuits to provide a signal that is related to the recorded flux. Thus, the voltage signals from such read/write heads, specifically from the magneto-resistive element, are not sensitive to the speed of the disk.

In a head having a magneto-resistive element, the element is formed so as to have a magnetization orientation along the length of the element; that is, magnetic dipoles are aligned parallel to the element's longitudinal axis. A current is applied longitudinally to the element. A graph of the resistance of the element to electric current, in relation to the direction of the element's magnetic dipoles, is a bell-shaped curve. For example, if the element is a nickel iron alloy, if no external flux is applied to the head, the resistance exhibited by the element to current applied in a longitudinal direction through the element (which is parallel to the magnetization) will be at a maximum. If, however, external magnetic flux is applied to the element which forces the element's magnetic dipoles into an orientation perpendicular to the length of the element, the element's resistance to the applied current will be at a minimum.

Otherwise stated, continuing with the same example, if the current flow is parallel to the magnetization of the element, the resistance of the element is at a maximum, but if the current flow is orthogonal to the magnetization, the resistance is at a minimum. Intermediate these two extremes, that is, with the element's magnetic dipoles aligned approximately forty-five degrees with the direction of the applied current, the change in resistance of the element with respect to the applied magnetic field is approximately linear for small variations in the applied magnetic field. It will be appreciated that the alignment of the element's magnetic dipoles is related to the applied magnetic flux, and thus the resistance of the element will be related to the direction and amount of applied magnetic flux.

There are several prerequisites for heads using magneto-resistive elements as read elements. The magneto-resistive element requires external "transverse" biasing to force it into a linear response mode so that the resistance changes in an approximately linear function of the applied flux. If a magneto-resistive element is not transversely biased, a small applied flux from a disk will be unable to make a large enough change in the resistance of the element to generate a sufficient read back signal. The same will occur if the element is biased too much, so that the magnetic dipoles are perpendicular to the element's longitudinal direction. In either case, the element will have a very low sensitivity to the applied flux level U.S. Pat. No. 4,535,375, issued to G. Mowry, et al., on Aug. 13, 1985, entitled Magnetoresistive Head, discloses a head with a magneto-resistive read element. The magneto-resistive element disclosed in that patent includes an elongated magneto-resistive element and a plurality of equipotential strips disposed along the element at a skewed angle (generally, approximately forty-five degrees) with respect to the element's longitudinal axis. A bias current is applied and the equipotential strips force the current to flow generally orthogonal to the strips. The magneto-resistive element's magnetic dipoles are at a forty-five degree angle with respect to the current.

A magneto-resistive element, which was originally magnetized in a single magnetic domain state (that is, a state in which substantially all of the magnetic dipoles are oriented in a common direction) has a tendency to develop a plurality of separate magnetic domains if disturbed by an external force, such as a magnetic field. One cause of the formation of multiple domains is the end effect, which is the demagnetizing field generated by the ends of the element. This field is generally inhomogeneous; causing the spread of the orientation of the dipoles. Spreading of the dipole orientation may also result from improper deposition techniques. Over time, if the element is first subjected to a strong enough magnetic flux which is then removed, the single magnetic domain may split into multiple magnetic domains throughout the element.

Multiple domains in magneto-resistive elements may arise from the fact that, during writing, in a head such as a yoke-type MR head in which the read and write devices are not separate, the magneto-resistive element is saturated with magnetic flux (hereafter "write flux"). This write flux is perpendicular to the longitudinal direction of the element, and the magnetic dipoles in the element tend to align with the applied write flux. After the write operation is completed, the element's magnetic dipoles return to an orientation along the element's longitudinal axis, but they need not return to their former orientations. They may instead be aligned in the opposite direction. As this repeatedly occurs following write operations, a number of domains develop with differing orientations of magnetic dipoles. Thus, multiple domains may be created throughout the elements, not just at the ends.

A result of the development of the multiple magnetic domains is Barkhausen noise, which is noise in the voltage signal due to sudden jumps in the magnetization of the element. The magneto-resistive element disclosed in the aforementioned U.S. Pat. No. 4,535,375 proposes to minimize Barkhausen noise by providing a very long magneto-resistive element and sensing the change in resistivity across only a small portion of its length. This can help with minimizing the Barkhausen noise due to end effects, but it does not significantly reduce the noise due to the creation of multiple domains along the element caused by the write flux applied to the element.

SUMMARY OF THE INVENTION

The invention provides a new and improved read/write head for use in a digital data processing system in which a magneto-resistive read element is provided, which arrangement minimizes Barkhausen noise while facilitating increased track density.

In one aspect of the invention, a read/write head for use in a digital data processing system is provided including a pair of poles having an enlarged yoke portion which tapers to a narrow pole tip portion. A write coil is disposed in the yoke portion to generate magnetic flux during writing, the poles directing the write flux to the pole tip portion. Preferably, a slot is formed in the yoke portion of one of the poles and an elongated strip of magneto-resistive material is situated adjacent to the slot to be used during reading operations. The pole tip portion of the slotted pole senses the magnetic flux from the disk and directs the flux to the magneto-resistive element. During reading, the write coil is energized to provide a transverse (linearizing) biasing field in the magneto-resistive element.

A longitudinal biasing coil is provided adjacent to the ends of the MR element to provide longitudinal bias just prior to or at the beginning of reading so as to ensure that the element obtains a single magnetic domain state. The foregoing may be incorporated in various shielded or multipole heads.

In another aspect of the invention, the sense conductors which are coupled to the ends of the center, active (or "sense") section of the element include extensions which loop around the ends of the MR element. Hence, when the sense current is applied to the MR element via the sense current conductors during reading, longitudinal bias is automatically supplied through the conductors to the loops at the ends of the element. If the loop extensions are joined together by a linking conductor which runs adjacent to the MR element, then transverse bias will also be supplied by the linking conductor when the sense current is applied to the sense current conductors.

Other advantages and features will become apparent from the following description of the preferred embodiment and from the claims.

BRIEF DESCRIPTION OF THE DRAWINGS

The above and further aspects of this invention may be better understood by referring to the following description taken in conjunction with the accompanying drawings, in which:

FIG. 2 depicts another embodiment of the invention; and

FIG. 3 depicts another alternate embodiment of the invention.

DESCRIPTION OF THE PREFERRED EMBODIMENT

Figure 1A:
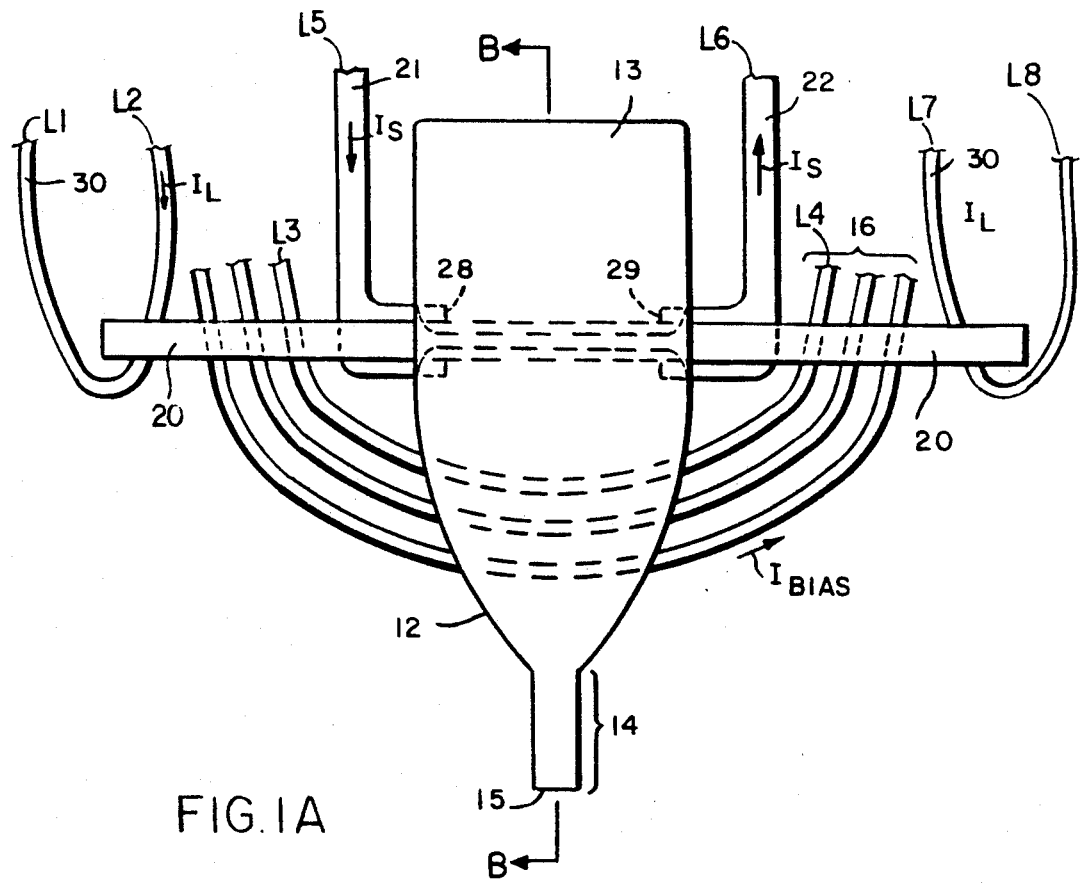
FIG. 1A depicts a top view of an MR pole structure in a read/write head constructed in accordance with the invention and FIG. 1B depicts a cross-sectional view of the pole structure depicted in FIG. 1A taken along axis B—B.
Figure 1B:
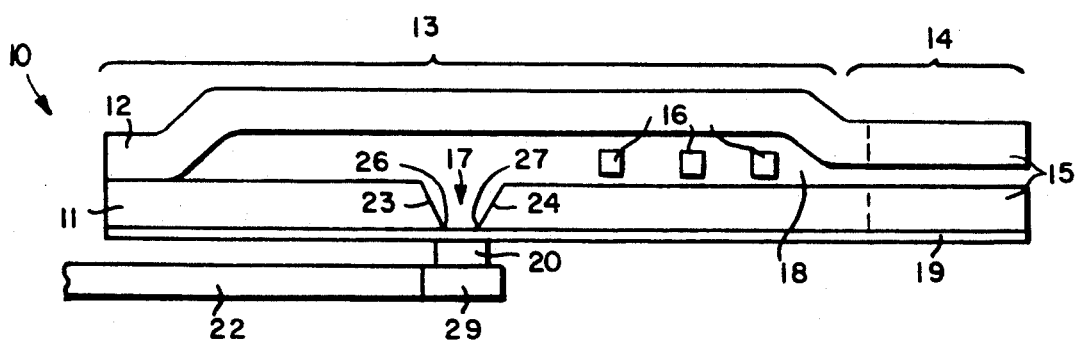

With reference to FIGS. 1A and 1B, a read/write head 10 constructed in accordance with the invention includes two poles 11 and 12 formed of a magnetic material separated by a layer 18 of insulation. The insulation in the yoke region is primarily hard-baked photoresist and while the insulation at pole tip region is of a harder material such as alumina. Each pole defines a relatively large yoke region 13 which tapers to a pole tip 14 having an end 15. In operation, the head is suspended from an arm (not shown) so that the end 15 is generally directed toward the surface of a spinning disk (not shown) which has magnetic media thereon, and the far end of the yoke region 13 (to the left as shown in FIG. 1B) will be distal from the disk surface. The head has an axis indicated by the legend B—B, and the arm holds the head so that the axis B—B is generally orthogonal to the disk surface.

Head 10 also includes a multiple-turn planar helical coil 16 (a portion of which is depicted) positioned between poles 11 and 12 in the yoke region to generate magnetic flux for writing data onto the disk. At the left end (or back closure portion) of the yoke region 13, the poles 11 and 12 touch so as to encircle a portion of the coil to provide a complete path of magnetic material between the poles in the yoke region 13. Otherwise, a separation is maintained between the poles in both the yoke region 13 and the pole tip 14. In the yoke region, the separation between the poles 11 and 12 may be relatively large, to allow the poles to accommodate the coil 16 and to minimize flux leakage between the poles. In the pole tip, however, the separation between the poles is relatively small.

In accordance with one aspect of the invention, a slot 17 may be formed in yoke region 13 of one pole in an orientation which is generally parallel to the expected orientation of the disk surface. That is, the orientation of the slot 17 is generally orthogonal to axis B—B. In the embodiment depicted in FIG. 1A, 1B the slot is formed in pole 11. Adjacent to the slot, an element 20 of magneto-resistive material, such as a nickel iron alloy (such as "Permalloy"), is positioned, electrically insulated from pole 11 by a thin, non-magnetic insulator 19 such as alumina or silicon dioxide. The element is formed so as to have a single magnetic domain with its magnetic dipoles situated parallel to the element's longitudinal axis, that is, perpendicular to the axis B-B. The ends of the magneto-resistive element 20 are connected to electrodes 21 and 22 which are also connected to a sensing circuit (not shown). Preferably the walls 23 and 24 defining slot 17 are not disposed orthogonally to element 20, but instead are slanted at an acute angle with respect to the element 20 so as to form pointed edges 26 and 27 adjacent to the element 20, as is shown in FIG. 1B. This will focus the flux path through the MR element from/to pole 11.

During a writing operation, an electrical signal representing the digital data is applied to the coil 16. The electrical signal applied to coil 16 varies to define the digital data to be recorded in a known manner. In response to the electrical signal, the coil generates magnetic flux in the poles. Assuming that, at one instance, the electrical signal is conditioned to enable the coil to generate magnetic flux upwardly toward pole 12 (FIG. 1B) and forwardly toward the tip (FIG. 1A), the magnetic flux is first received in pole 12 in the yoke region 13. The flux travels in pole 12 through the yoke region toward the pole tip. Because the pole tip has a smaller cross-sectional area than the yoke region, the flux is concentrated in the gap region; that is, the amount of flux per unit area in the gap region is greater than in the yoke region. At the end 15 of pole 12, the flux exits the pole and goes through the magnetic surface of the disk thereby impressing the magnetic flux in the magnetic media that is then adjacent the gap.

The flux returns from the disk through end 15 of pole 11. From there, it goes through the tip of pole 11 to the pole's yoke region. The larger yoke region permits the flux to spread out. At slot 17, the pointed edge 26 adjacent to the magneto-resistive element 20 concentrates the flux and directs it through the element 20, which conducts it to edge 27. Edge 27 receives the flux from magneto-resistive element 20 and directs it to the distal end of the yoke region 13 of pole piece 11. Since the flux during a write operation is generally very large, the magneto-resistive element essentially saturates and largely acts as an air gap across the slot 17.

It will also be appreciated that, if at some instances the magnetic flux generated by coil 16 has the opposite direction from that described above, the path of the flux through the poles and disk's magnetic media is also reversed. Thus, the poles 11 and 12, the disk magnetic media and gap 17 (element 20 having been predominantly saturated) form a complete magnetic circuit for the flux generated by write coil 16 during a writing operation. In addition, with the disk spinning under the head, the arm (not shown) maintaining the head over one track on the disk, the varying magnetic flux generated by head 10 in response to the variations in the digital data is applied to the magnetic media along the track. Accordingly, the flux changes representative of the digital data are impressed along the track on the disk.

In accordance with another aspect of the invention, while, or immediately after, the data is written, a longitudinal biasing current $I_L$ is applied to bias conductors 30 positioned at or near the ends of the magneto-resistive element 20. The current applied to conductors 30 establishes a small magnetic field in the ends of magneto-resistive element 20 which enables the magnetic dipoles in the ends of the element to orient in one direction along the element's longitudinal axis. In effect, the write flux through the magneto-resistive element 20 forces the element's dipoles in an orientation orthogonal to the longitudinal direction. When the write flux is removed, the dipoles may return to a longitudinal orientation, but in either direction. The longitudinally biasing magnetic field applied by the biasing conductors 30 enables the dipoles to return to a selected (longitudinal) direction, which is determined by the field generated by the biasing conductors. Accordingly, the biasing conductors 30, and application of current thereto after the writing operation, will drive the magneto-resistive element into a single magnetic domain state at its ends, which in turn induces a single magnetic domain state in the center or active region of the MR element.

After data has been written, it may be read by positioning the read/write head 10 over the disk track on which the data has been written. During a reading operation, a constant current transverse bias is applied to the write coil 16. As a result of this current, a constant magnetic flux is generated, which is applied to poles 11 and 12 and, accordingly, to magneto-resistive element 20. This biasing current is high enough to generate sufficient flux for transverse biasing, but is small enough that the flux does not interfere with the data which has been recorded on the disk.

As the disk moves adjacent end 15, the transitions in the flux recorded on the disk provides magnetic flux which permeates poles 11 and 12 through the end 15 of the poles. The magneto-resistive element 20 essentially senses the flux in pole 11 near which it is situated. The flux permeating pole 12 has a small effect on element 20. It will be appreciated that the edges 26 and 27 in pole 11, which are defined by the respective walls 23 and 24 positioned at acute angles, insure that the flux is efficiently conducted to and through the magneto-resistive element 20 and to reduce fringing edge effects of the magnetic flux at the walls 23 and 24 which might cause at least some of the flux to bypass some or all of magneto-resistive element 20.

Electrodes 21 and 22 are attached to element 20 and define the active region of the element between them. Sensing equipment (not shown) applies a sense current $I_s$ upon the electrodes 21 and 22, and detects changes in the voltage in the MR sense signal on the electrodes. The changes in the voltage sensed by the sensing equipment are directly related to the changes in resistance of the magneto-resistive element 20, and specifically the changes in the resistance of the sense portion of the element between end faces 28 and 29 of the electrodes 21 and 22. Thus, as the disk passes under end 15 of head 10, the changes in the voltage level, compared to the voltage level resulting from only the bias flux from coil 16, are directly related to the changes in the resistance of the magneto-resistive material, and, accordingly, the change in the flux pattern on the disk sensed by element 20.

It will be appreciated that two factors limit the density with which data can be recorded on the disk, namely, the number of tracks which can be recorded per unit of radius of the disk, and the number of flux transitions which may be recorded per length of track. The number of tracks per unit of radius is, in turn, related to the width of the poles 11 and 12 at the end 15.

Thus, the wider the poles at end 15, the fewer the number of tracks which may be recorded per unit of radius.

The number of flux transitions which may be recorded per length of track is related to several factors, including the width of the tip gap, that is, the distance between poles at end 15. It will be appreciated that the larger the gap width, the less data may be recorded on a track.

The arrangement depicted in the FIGS. 1A and 1B permits both the width of the poles at end 15 and the gap tip width to be minimized, thus enhancing the density of data which may be recorded, while using a magneto-resistive element 20 of sufficient length to minimize the effects of the Barkhausen noise due to creation of multiple magnetic domains at the ends of the magneto-resistive element 20.

By removing the magneto-resistive element 20 from the pole tip 14 and placing it in the yoke region 13, both the width of the poles and the width of the gap at end 15 may be made smaller, allowing the poles to taper down to the pole tip. Since the width of the poles in the yoke region 13 is much larger than the width at the poles end 15, the magneto-resistive element 20 may be made longer, thus minimizing the Barkhausen noise due to end effects. The coil wires 30 further reduce Barkhausen noise in the element 20 by urging the magnetic dipoles in a common direction following writing operations.

In addition, since the width of poles 11 and 12 in the yoke region 13 of the new read/write head is independent of the track density, the length of the magneto-resistive element between the ends 28 and 29 of the electrodes 21 and 22 is also independent of the track density, the sensitivity during reading is also independent of the track density. If the portion of the magneto-resistive element 20 between the sensing electrodes 21 and 22 is short, as is the case when the element is in the gap in the pole tip region, the resistance of the element and the change in resistance during reading are both low, and so the sensitivity of the element is also low. However, since the element 20 in the new head is in the yoke region 13, the portion of the element between the electrodes 21 and 22 can be made long enough to permit a higher sensitivity. Since the width of the yoke is larger than the track width, the sensitivity of the head is approximately independent of the track width, except for the effect of the higher reluctance due to the tapering pole tips and increased flux loss due to leakage.

Coil 16, coil 30, and electrodes 21, 22 each extend through electrical leads L1–L8 and terminate at assigned contact pads (not shown). The eight leads can be connected to six contact pads, if leads L2 and L5, and L4 and L6, are paired together to share a respective pad. The external read/write drive circuit is coupled to the head via the contact pads.

A preferred embodiment of the invention is shown in FIG. 2, where a longitudinal biasing coil 110 is formed with two legs 110a, 110b as an extension of the MR sense current electrodes 21, 22 so that the longitudinal bias coil does not require separate leads or pads. Leg 110a is coupled to and extends out from electrode 21 at joint 21a. Leg 110b is coupled to and extends out from electrode 22 at joint 22a. In this embodiment, when sense current $I_s$ is applied to the MR element via electrode leads 21, 22, a portion of $I_s$ will flow in legs 110a, 110b so that a longitudinal bias field will be generated and applied to the ends 108, 109 of MR element 20 to drive the ends into a single domain state and to induce a single domain state in the element's center active region defined between conductor end faces 28, 29.

Ordinarily, the sense current is applied to the MR element before the read pole carries flux of interest to the MR element. This insures that in this embodiment the ends of the MR element and therefore the element's center active section will be driven into a preferred domain state before reading the flux of interest.

The longitudinal bias coil legs 110a, 110b extend out from the sense current conductors 21, 22, wrap around the ends 108, 109 of the MR element 20 and then terminate either coupled to the MR element at respective junctions 104, 105 or coupled together via a linking conductor 115 (shown in dotted outline under the MR element in FIG. 2 and shown below the MR element in FIG. 3). By adjusting the relative resistances between the MR element and the linking conductor 115, the amount of current flowing in each path may be adjusted to produce the desired linear operation of the MR head. It is not necessary that the element and the conductor overlap. It is only necessary that the linking conductor 115 provide a return path for the bias current and that a transverse field is produced by the linking conductor 115 through the yoke (predominantly in the active region) to bias the element in order to produce the desired linear operation. This eliminates use of the write coil in the read cycle.

There may be an insulation layer between these windings and the MR element; alternatively the insulation layer may be omitted if the windings are of sufficiently different resistance compared to the resistance of the MR element so as to establish a separate current path in the bias coil windings.

The read and write circuits now each terminate in two leads. At a maximum this requires four contact pads. However, two of the leads, such as L10 or L11, can be combined, such as with L12 or L13, so that only three contact pads are required.

The method of manufacture of this embodiment includes forming the lower portion of legs 110a, 110b by forming conducting parts 103a and conductor 115 of a material having the desired resistance. Linking conductor 115 and conducting parts 103a may be isolated if desired by an insulation layer except at the points 104, 105. Alternatively, if no insulation is desired, linking conductor 115 may connect points 104 and 105 below the turns of the coil 110, as shown in FIG. 3. An insulating layer, to isolate the conducting parts from the MR element may then be deposited if desired.

Next, the MR element 20 is formed such as of NiFe and electrodes 21, 22 are preferably formed such as of gold or copper. Simultaneously the upper portion of legs 110a, 110b are formed with parts 103b. An insulation layer 19 is then deposited. The pole 11 is next deposited with slot 17 aligned overlapping the active MR element center section, followed by the deposition of insulating layers 18. Coil 16 is preferably next formed, again followed by insulation layers 18. Pole 12 can then be formed over this assembly.

The foregoing description has been limited to specific embodiments of this invention. It will be appreciated, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A thin film head comprising
a pole comprising magnetic material for conducting magnetic flux generally along a longitudinal axis of said pole,
an elongated magneto-resistive (MR) element comprising magnetic material having dipoles which can be oriented by an applied magnetic field into a single domain orientation, said MR element being disposed adjacent to said pole and oriented transversely to said longitudinal axis so that magnetic flux conducting in said pole is conducted by said dipoles through said MR element transversely to the elongation thereof,
means for applying a sense signal from a source to said MR element to allow said flux conducted through said MR element to be detected based on said signal, and
an energizable bias conductor connected to receive a portion of said sense signal, said energizable bias conductor being magnetically coupled to a region of the MR element and generating a magnetic field near said region in response to said portion of said sense signal, said magnetic field tending to drive said dipoles of said MR element essentially into said single domain orientation.

2. The head of claim 1 further comprising means for magnetically coupling a portion of said sense signal to a second region of said MR element so that said second portion of said sense signal generates a magnetic field near said second region that tends to orient said dipoles of said MR element at an oblique angle with respect to the elongation of said element.

3. The head of claim 1 further comprising wherein said MR element a magnetic medium, said energizable bias conductor includes at least one coil disposed at an end of said MR element.

4. The head of claim 3 wherein said elongated MR element is disposed perpendicular to said longitudinal axis, said bias conductor including a plurality of coils each of which is disposed at one of said ends of the MR element.

5. The head of claim 4 wherein each one of said coils runs adjacent to or wraps around one of said ends of the MR element and the coils are coupled together via a linking conductor.

6. The head of claim 5 wherein the linking conductor runs lengthwise along and adjacent to the MR element to provide transverse bias to the MR element active region.

7. The head of claim 6 wherein an insulation layer is formed between the linking conductor and the MR element.

8. The head of claim 5 wherein an insulation layer is formed between the linking conductor and the MR element.

9. The head of claim 4 wherein said means for applying said sense signal comprises two leads which terminate at respective contact pads, said plurality of coils being electrically connected to said leads.

10. The head of claim 4 further comprising an insulation layer between the coils and the MR element.

11. The head of claim 3 wherein said means for applying said sense current comprises two electrodes which are attached to the MR element to define three regions of the MR element, said three regions including two ends and a center active region between the two ends, said energizable bias conductor being magnetically coupled to at least one of said ends.

12. The head of claim 11 wherein the two electrodes terminate at respective contact pads.

13. The head of claim 12 wherein the bias conductor includes at least one coil.

14. The head of claim 13 wherein said MR element is disposed perpendicular to said longitudinal axis, said bias conductor including a plurality of coils each of which is disposed around at one of said ends of the MR element.

15. The head of claim 14 wherein each one of said coils is formed as an extension of a respective one of the two electrodes.

16. The head of claim 15 wherein each one of said coils runs adjacent to or wraps around one of said ends of the MR element and terminates at a point on the other one of said ends of the MR element.

17. The head of claim 15 wherein each one of said coils runs adjacent to or wraps around one of said ends of the MR element and the coils are coupled together via a linking conductor.

18. The head of claim 17 wherein the linking conductor runs lengthwise along and adjacent to the MR element to provide transverse bias to the MR element active region.

19. A thin film head for reading magnetic flux from and writing magnetic flux to a magnetic storage medium, said head comprising
a pole comprising magnetic material for conducting said magnetic flux,
an elongated magneto-resistive (MR) element comprising magnetic material having dipoles which can be oriented into a single orientation, said MR element being disposed adjacent to said pole and oriented transversely to said longitudinal axis so that magnetic flux conducting in said pole is conducted by said dipoles through said MR element transversely to the elongation thereof,
an energizable bias conductor magnetically coupled to at least one end of said MR element such that a magnetic field generated by applying current to said conductor will tend to drive the dipoles essentially into a single orientation, and
a write coil for conducting current to generate magnetic flux in said pole during writing and for providing transverse flux to the MR element during reading.

20. A thin film head comprising
an elongated magneto-resistive (MR) element and a pole for reading flux from a magnetic medium, said pole being disposed along a longitudinal axis and said MR element being disposed adjacent to said pole, the MR element cooperating with the pole to read magnetic flux from the medium,
the MR element being formed of magnetic material having dipoles which can be oriented into a single domain orientation by application of a magnetic field, said MR element being oriented transversely to said axis so that magnetic flux read from said medium and conducting in said pole is conducted by said dipoles through said MR element transversely to the elongation thereof,
two electrodes which are attached to the MR element and which to define three regions of the MR element, said regions including the two ends of the MR element and a center active region between the two ends, said electrodes applying a sense signal from a source to said elongated MR element to allow flux through said MR element to be detected based on said signal, and an energizable bias conductor connected to at least one of said two electrodes to receive a portion of said sense signal, said bias conductor being magnetically coupled to the ends of the MR element to generate a magnetic field near said ends in response to said portion of said sense signal, said magnetic field tending to drive said dipoles in the three regions of said MR element essentially into said single orientation in absence of other magnetic fields, and an energizable bias source disposed adjacent to at least the center active region of said MR element for generating a magnetic field during reading for canting the orientation of said domains in at least the center active region to other than the single domain orientation.

21. The head of claim 20 wherein the energizable bias conductor includes a pair of coils each of which is located at one of said ends of the MR element.

22. A computer system having a thin film head constructed to be coupled to a read circuit for reading flux from a magnetic medium, the head comprising a pole comprising magnetic material for conducting magnetic flux from said medium generally along a longitudinal axis of said pole, an elongated magneto-resistive (MR) element disposed adjacent to said pole and cooperating with the pole to read the flux from the medium, the MR element formed of magnetic material having dipoles which can be oriented into a single domain orientation by application of a magnetic field, said MR element being oriented transversely to said axis so that magnetic flux read from said medium and conducting in said pole is conducted by said dipoles through said MR element transversely to the elongation thereof, two electrodes which are attached to the MR element to define three regions of the MR ent, said regions including the two ends of the MR element and a center active region between the two ends, said electrodes applying a sense signal from said read circuit to said elongated MR element to allow flux through said MR element to be detected based on said signal, an energizable bias conductor connected to at least one of said two electrodes to receive a portion of said sense signal, said bias conductor being magnetically coupled to the ends of the MR element to generate a magnetic field near said ends in response to said portion of said sense signal, said magnetic field tending to drive said dipoles in the three regions of said MR element essentially into said single orientation in absence of other magnetic fields, the bias conductor including a pair of coils each of which is disposed at one of said ends of the MR element, each one of said coils being connected to and extending from one of said electrodes, said coils being coupled to each other by a coupling link running adjacent to the MR element, the coupling link forming a bias source for generating a magnetic field during reading for canting the orientation of said dipoles in at least the center active region to other than the single domain orientation, and the energizable bias conductor, the bias source and the electrodes being coupled a pair of contact pads for coupling to said read circuit.

23. A thin film head comprising a pole comprising magnetic material for conducting magnetic flux generally along a longitudinal axis of said pole;

an elongated magneto-resistive (MR) element comprising magnetic material having dipoles which can be oriented by an applied magnetic field into a single domain orientation, said MR element being disposed adjacent to said pole and oriented transversely to said longitudinal axis so that magnetic flux conducting in said pole is conducted by said dipoles transversely to the elongation of said MR element;

a sense circuit for applying a sense current from a source to said MR element to allow flux conducted through said MR element to be detected based on said current; and a bias circuit, electrically connected to said sense circuit and magnetically coupled to said MR element, for generating a magnetic field directed along the elongation of said MR element in response to a portion of said sense current, said magnetic field tending to drive said dipoles in said MR element into said single domain orientation.

24. The thin film head of claim 23 wherein said source is a current source and sense circuit and said bias circuit share a set of connection pads for connection to said current source.

25. The thin film head of claim 23 wherein said bias circuit is further magnetically coupled to said MR element for generating a transverse magnetic field perpendicular to the elongation of said MR element in response to said portion of said sense current, said transverse magnetic field tending to orient said dipoles of said MR element at an oblique angle with respect to the elongation of said element.

26. A thin film head that includes a pole disposed along a longitudinal axis for reading magnetic flux from and writing magnetic flux to a storage medium, and a write coil for conducting current to generate said flux in said pole during writing, said head further comprising an elongated magneto-resistive (MR) element for cooperating with said pole to read said flux from said storage medium, said MR element being disposed adjacent to said pole and being formed of magnetic material having dipoles which can be oriented into a single domain orientation by application of a magnetic field, said MR element being oriented transversely to said axis so that magnetic flux conducting in said pole is conducted by said dipoles through said MR element transversely to the elongation thereof, two electrodes which are attached to the MR element to define three regions of said MR element, said regions including two ends and a center active region, an energizable bias conductor magnetically coupled to the ends of the MR element such that a magnetic field generated by applying current to said conductor will tend to drive the dipoles in the three regions of the MR element into a single orientation in the absence of other magnetic fields, and an energizable bias source disposed adjacent to said center active region of said MR element for generating a magnetic field during reading to cant the orientation of the dipoles in the center region to other than the single domain orientation, said energizable bias source including said write coil.

27. A thin film head comprising a pole comprising magnetic material for conducting magnetic flux generally along a longitudinal axis of said pole, an elongated magneto-resistive (MR) element comprising magnetic material having dipoles which can be oriented by an applied magnetic field into a single domain orientation, said MR element being disposed adjacent to said pole and oriented transversely to said longitudinal axis so that magnetic flux conducting in said pole is conducted by said dipoles through said MR element transversely to the elongation thereof, means for applying a sense signal from a source to said MR element to allow said flux conducted through said MR element to be detected based on said signal, an energizable bias conductor connected to receive a portion of said sense signal, a first portion of said energizable bias conductor being magnetically coupled to said MR element to generate a first magnetic field in response to said portion of said sense signal that tends to drive said dipoles of said MR element essentially into said single domain orientation, and a second portion of said energizable bias conductor being magnetically coupled to said MR element to generate a second magnetic field in response to said portion of said sense signal that tends to orient said dipoles of said MR element at an oblique angle with respect to the elongation of said element.

* * * * *